United States Patent
Dix et al.

(10) Patent No.: US 9,423,026 B2
(45) Date of Patent: Aug. 23, 2016

(54) SYSTEM AND METHOD FOR CONTROLLING A CONTINUOUSLY VARIABLE TRANSMISSION WHEN TRANSITIONING OPERATION FROM A HYDROSTATIC MODE TO A HYDRO-MECHANICAL MODE

(71) Applicant: CNH Industrial America, LLC, New Holland, PA (US)

(72) Inventors: Peter Dix, Naperville, IL (US); Pawel Kuros, Wood Dale, IL (US); Garth Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/565,801

(22) Filed: Dec. 10, 2014

(65) Prior Publication Data
US 2015/0176705 A1   Jun. 25, 2015

Related U.S. Application Data

(60) Provisional application No. 61/918,765, filed on Dec. 20, 2013.

(51) Int. Cl.
*F16H 61/431*   (2010.01)
*F16H 47/04*   (2006.01)
(Continued)

(52) U.S. Cl.
CPC .............. *F16H 61/66* (2013.01); *F16H 47/04* (2013.01); *F16H 61/0246* (2013.01);
(Continued)

(58) Field of Classification Search
CPC .... F16H 61/431; F16H 47/04; F02D 41/021; F02D 41/0215; B60K 28/16; B60K 23/0808; E02F 9/2253; E02F 3/434; F16D 48/06

USPC .......... 701/50, 69, 84, 110; 475/81; 477/69, 477/115; 60/327
See application file for complete search history.

(56) References Cited

U.S. PATENT DOCUMENTS 4,122,732 A * 10/1978 Chana ..................... F16H 47/04
477/69
4,168,637 A    9/1979 Orshansky, Jr. et al.
(Continued)

FOREIGN PATENT DOCUMENTS

WO   WO 2012/171812 A1   12/2012
WO   WO 2012/177187 A1   12/2012
(Continued)

OTHER PUBLICATIONS

New Holland Auto Command Transmission. (3 pages) Dated Dec. 8, 2014 Website: agriculture.newholland.com.
(Continued)

*Primary Examiner* — Yuri Kan
(74) *Attorney, Agent, or Firm* — Sue C. Watson

(57) ABSTRACT

In one aspect, a method for controlling a continuously variable transmission when transitioning the transmission from operation within a hydrostatic mode to operation within a hydro-mechanical mode may generally include initially operating the transmission in the hydrostatic mode, receiving a mode switch signal associated with transitioning the operation of the transmission to the hydro-mechanical mode and initiating a clutch swap between a secondary range clutch and a directional clutch of the transmission. In addition, the method may include adjusting a swash plate angle of the transmission as the directional clutch is slipped in order to transition the operation of the transmission to a point along a hydro-mechanical operating curve and fully engaging the directional clutch to allow operation of the transmission along the hydro-mechanical operating curve.

15 Claims, 9 Drawing Sheets

(51) Int. Cl.
*F16H 61/66* (2006.01)
*F16H 61/02* (2006.01)

(52) U.S. Cl.
CPC ... *F16H 61/431* (2013.01); *F16H 2061/6601* (2013.01); *F16H 2061/6608* (2013.01); *F16H 2061/6609* (2013.01)

(56) References Cited

U.S. PATENT DOCUMENTS

| | | | |
|---|---|---|---|
| 4,306,467 A * | 12/1981 | Pollman | F16H 47/04 475/81 |
| 4,341,131 A * | 7/1982 | Pollman | F16H 47/04 475/81 |
| 4,776,233 A | 10/1988 | Kita et al. | |
| 5,683,322 A | 11/1997 | Meyerle | |
| 6,519,937 B2 | 2/2003 | Nanri et al. | |
| 6,626,785 B2 | 9/2003 | Pollman | |
| 6,761,658 B1 | 7/2004 | Stettler, Jr. | |
| 6,852,056 B2 | 2/2005 | Weeramantry | |
| 7,421,327 B2 * | 9/2008 | Romer | B60K 28/16 303/122.08 |
| 7,530,913 B2 | 5/2009 | Fabry et al. | |
| 7,828,683 B2 | 11/2010 | Sedoni et al. | |
| 8,216,109 B2 | 7/2012 | Dahl et al. | |
| 8,262,525 B2 | 9/2012 | Legner et al. | |
| 8,308,597 B2 | 11/2012 | Hiraoka et al. | |
| 8,696,509 B2 | 4/2014 | Panizzolo et al. | |
| 2001/0056319 A1 * | 12/2001 | Rocke | E02F 3/434 701/50 |
| 2003/0010026 A1 | 1/2003 | Evans et al. | |
| 2003/0225500 A1 * | 12/2003 | Bergqvist | F02D 41/021 701/84 |
| 2005/0221951 A1 * | 10/2005 | Berger | F16D 48/06 477/115 |
| 2013/0096784 A1 | 4/2013 | Kohler et al. | |
| 2014/0039767 A1 * | 2/2014 | Jensen | B60K 23/0808 701/50 |
| 2014/0379243 A1 * | 12/2014 | Hyodo | F02D 41/0215 701/110 |
| 2015/0075146 A1 * | 3/2015 | Bedert | E02F 9/2253 60/327 |

FOREIGN PATENT DOCUMENTS

WO    WO 2013/029052 A3    2/2013
WO    WO 2013/074430 A1    5/2013

OTHER PUBLICATIONS

CTV (12 pages) Dated Dec. 8, 2014 Website: www.slideshare.net.
Tractor by Net (2 pages) Dated Dec. 8, 2014 Website: www.tractorbynet.com.

* cited by examiner

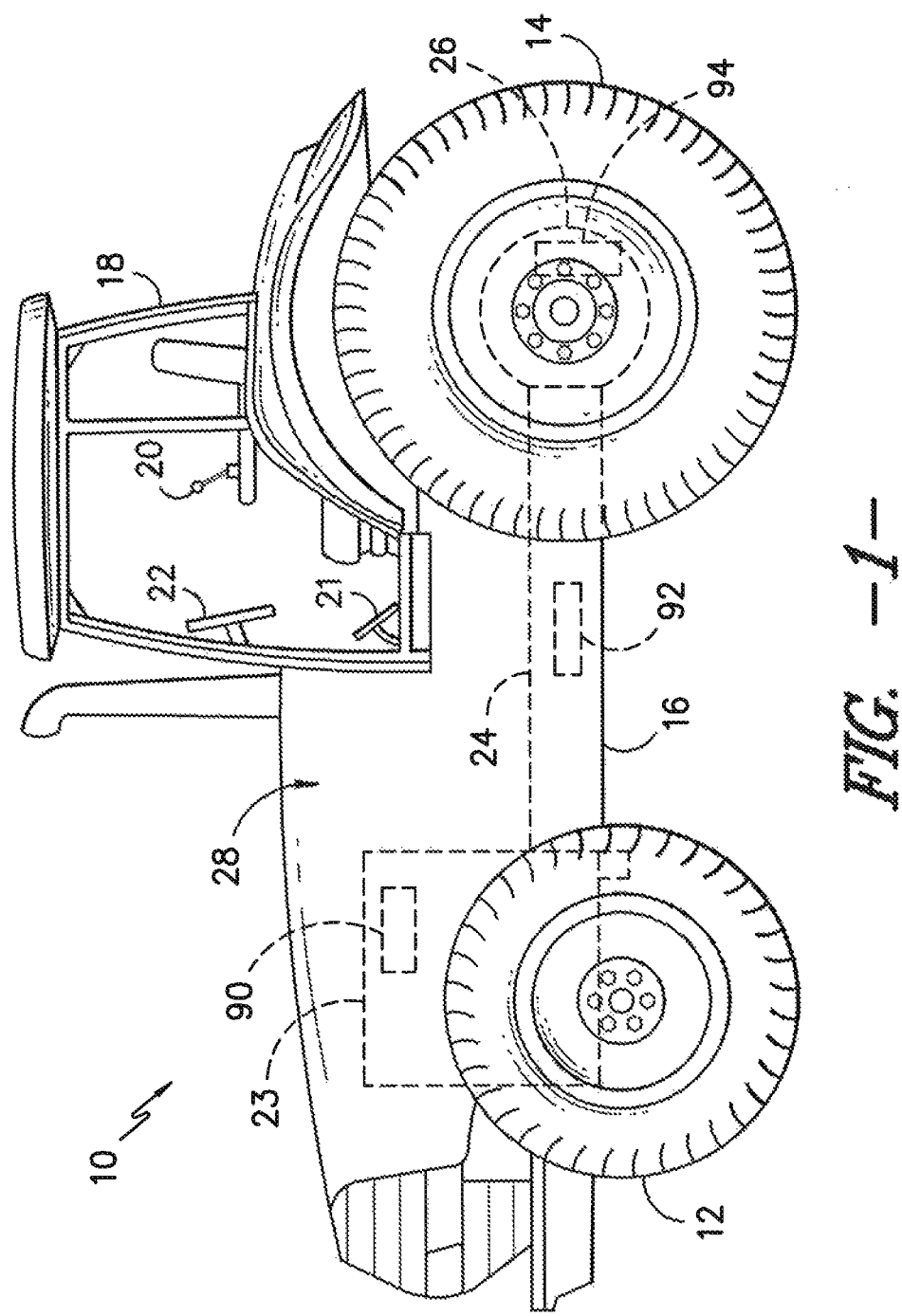
FIG. -1-

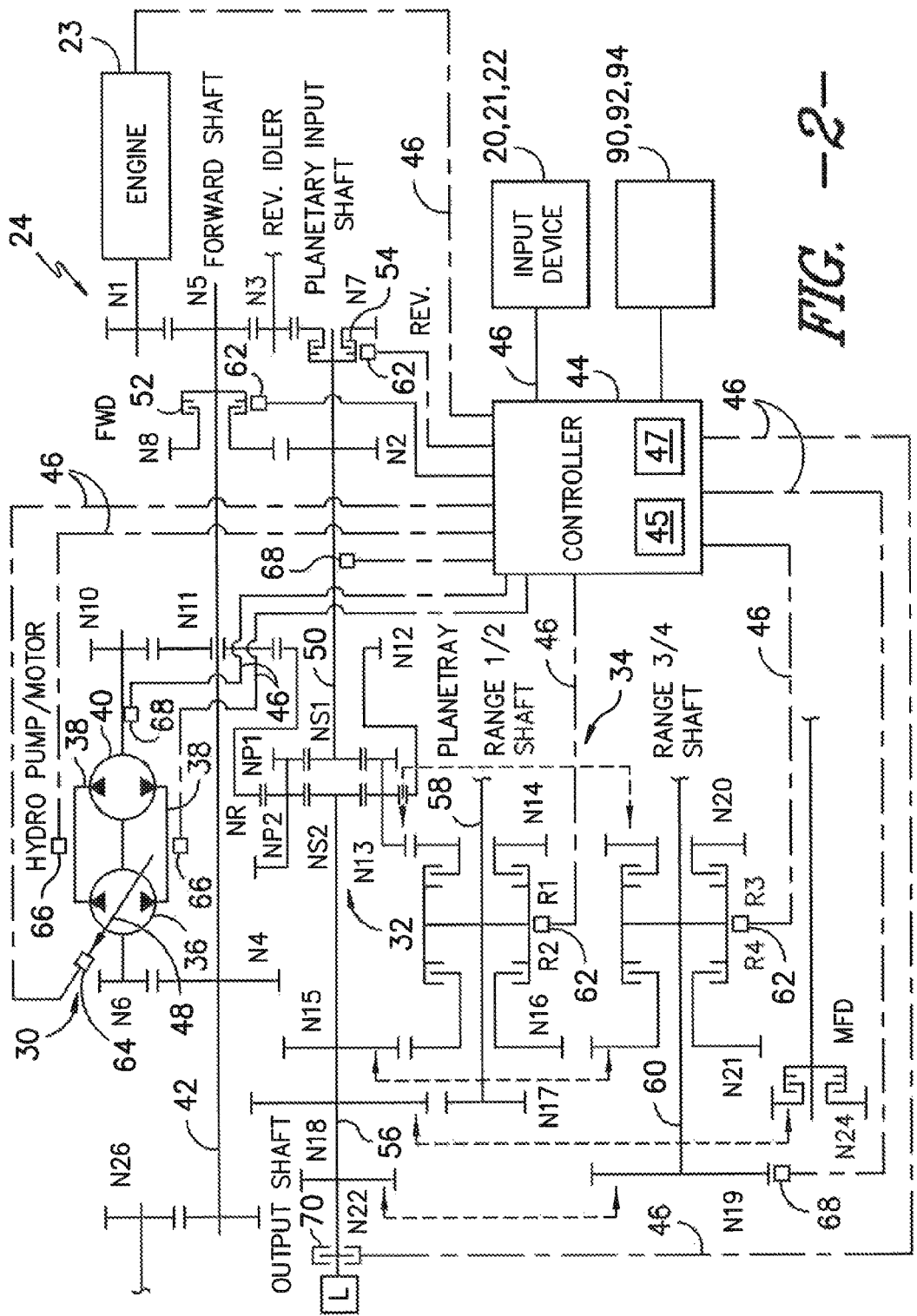
FIG. -2-

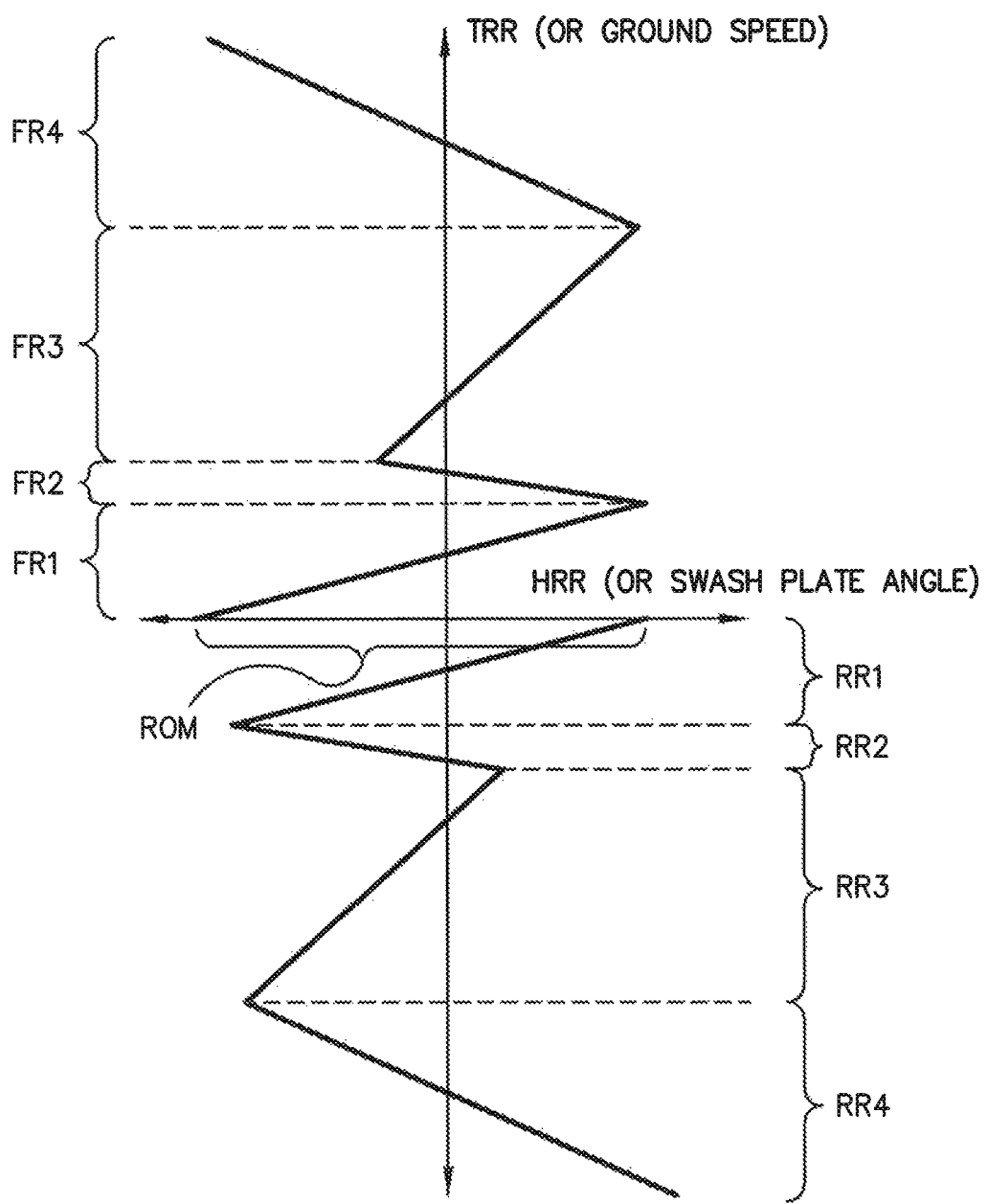
FIG. -3-

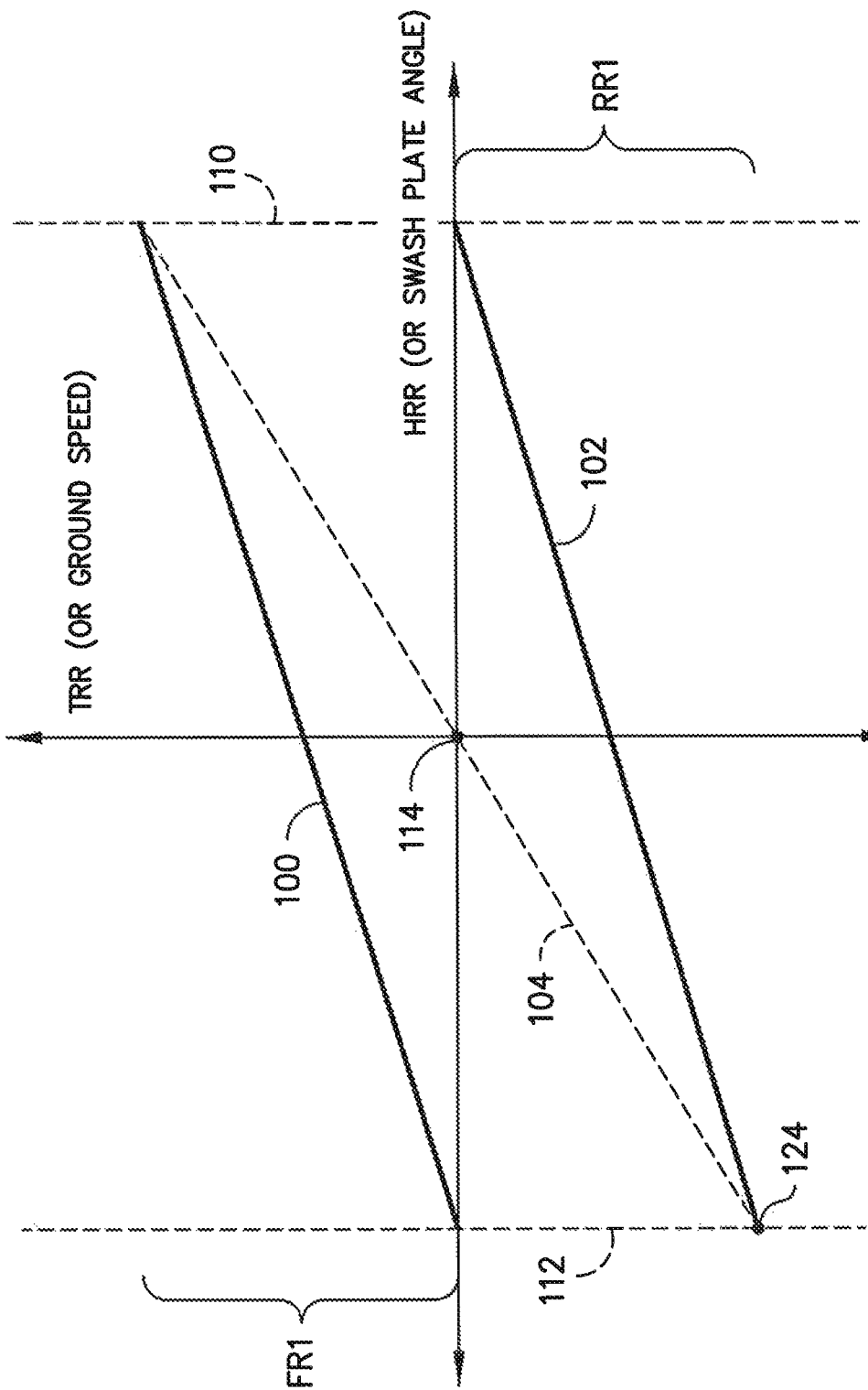

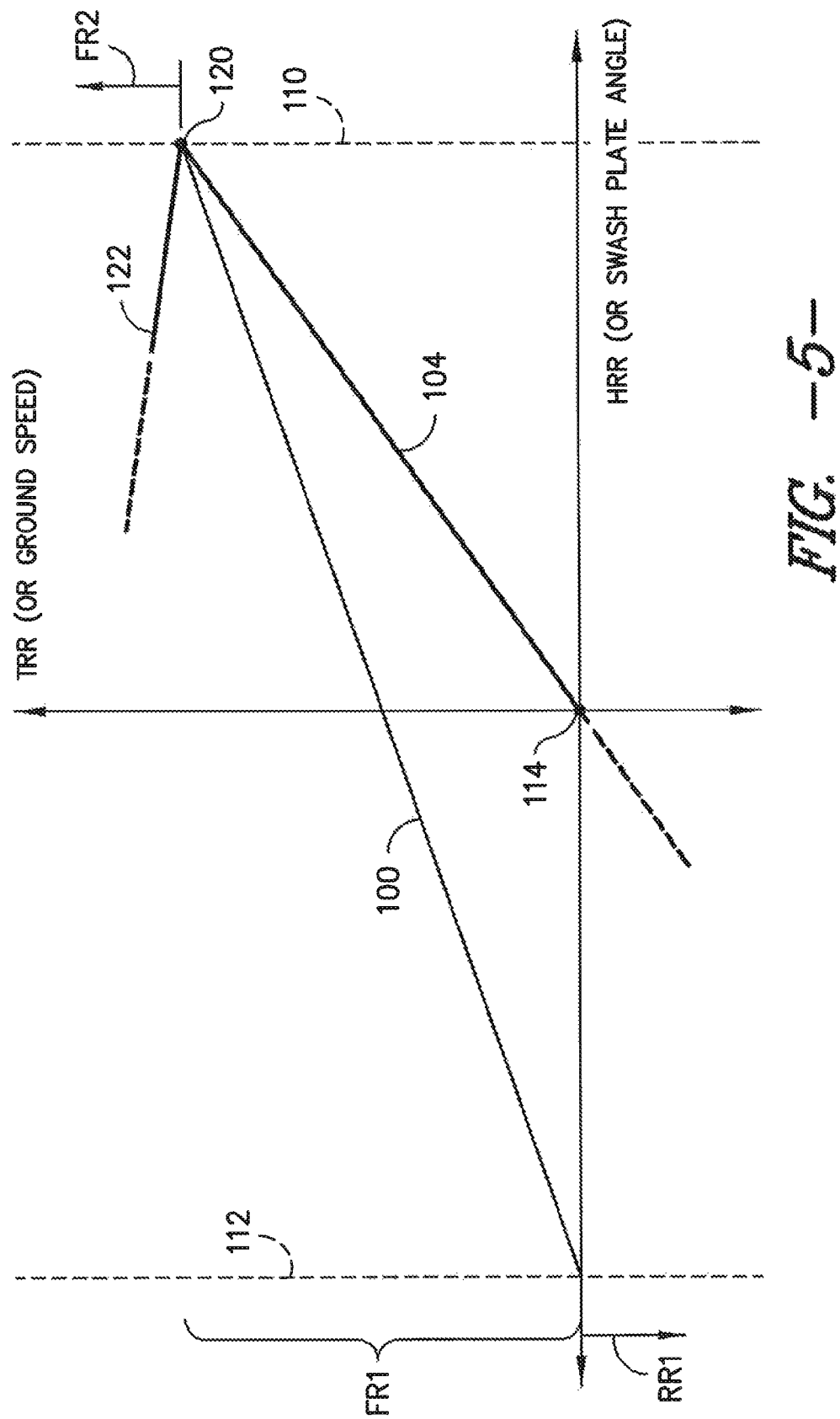
FIG. -5-

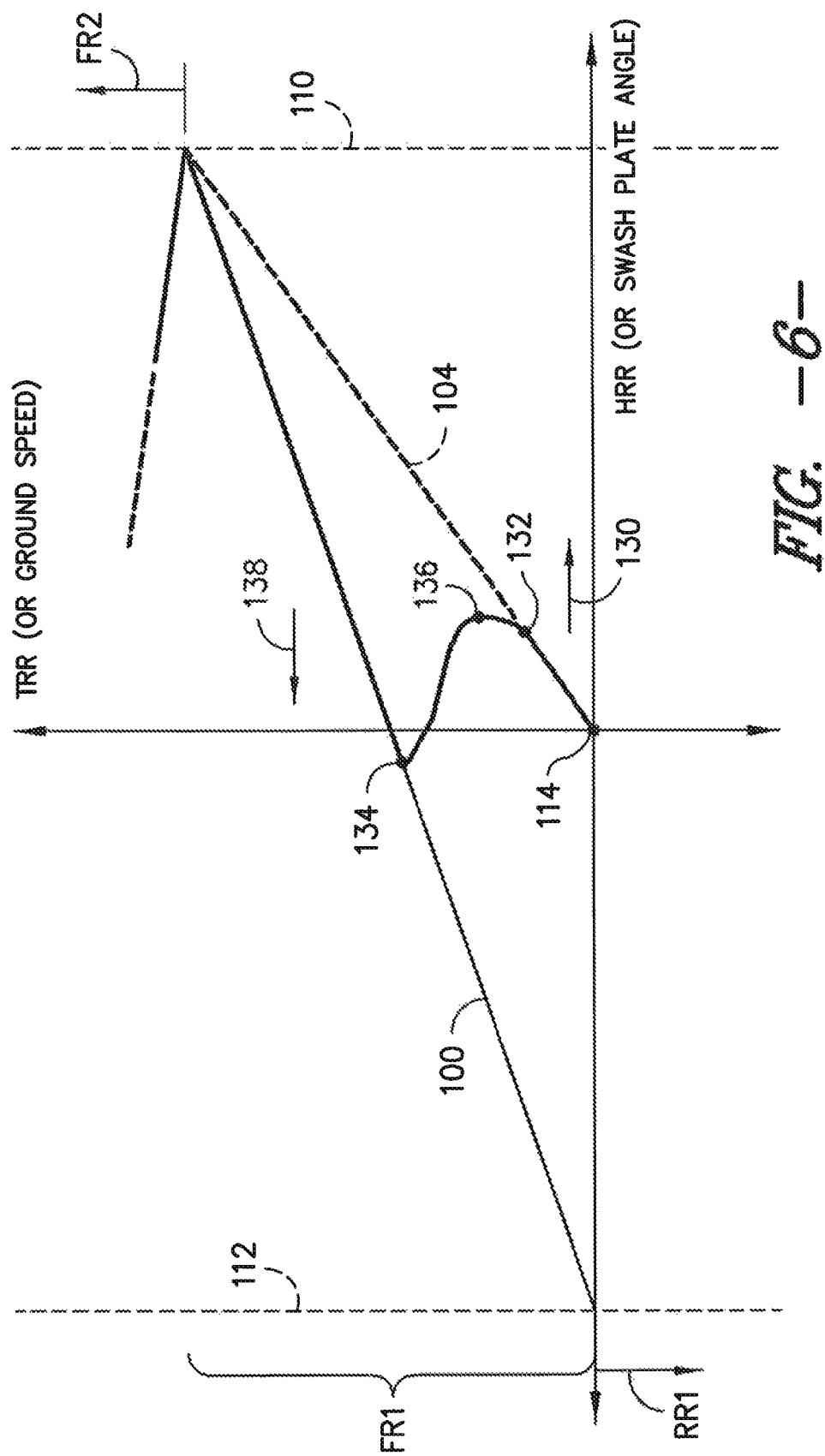
FIG. -6-

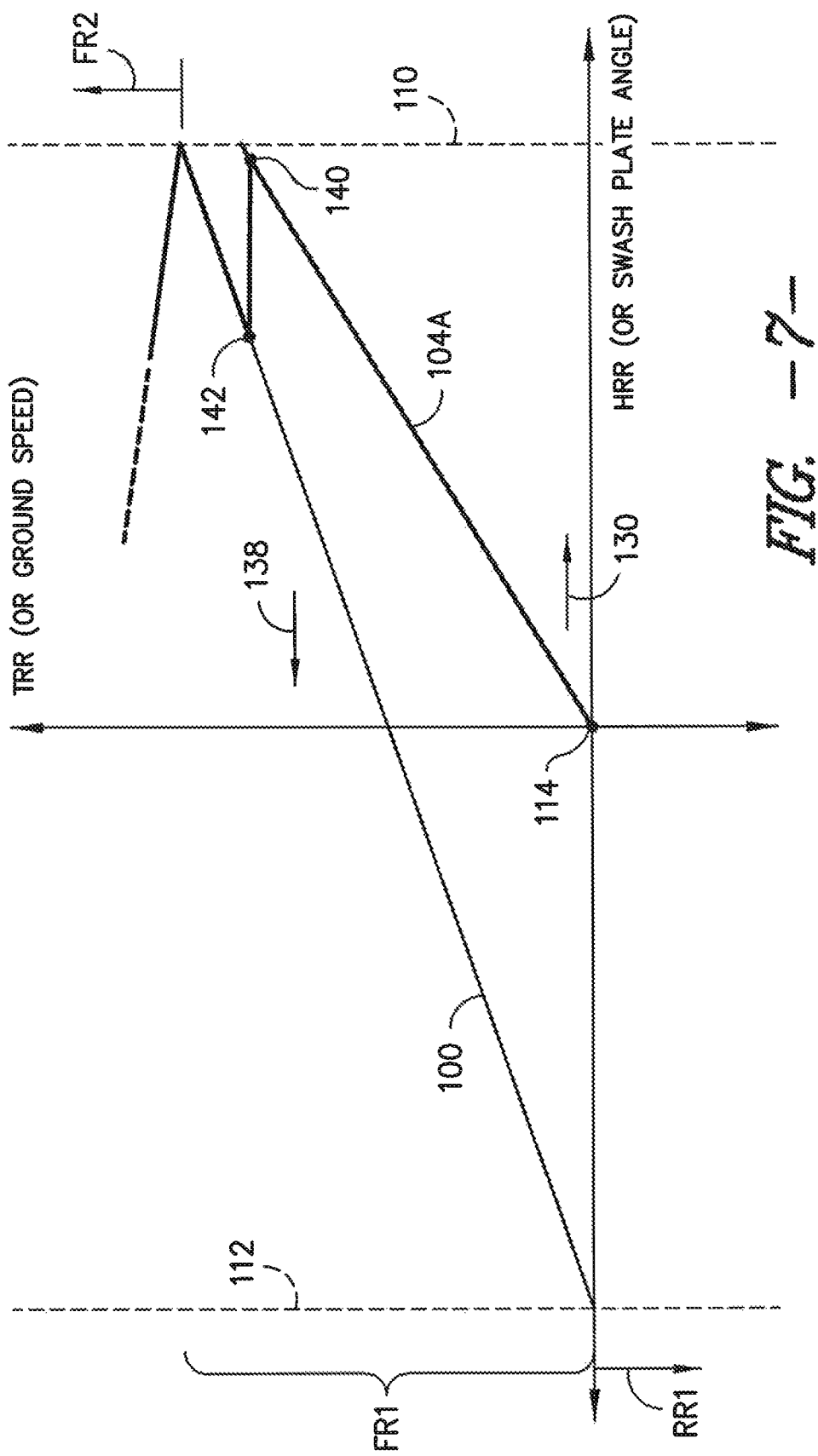
FIG. -7-

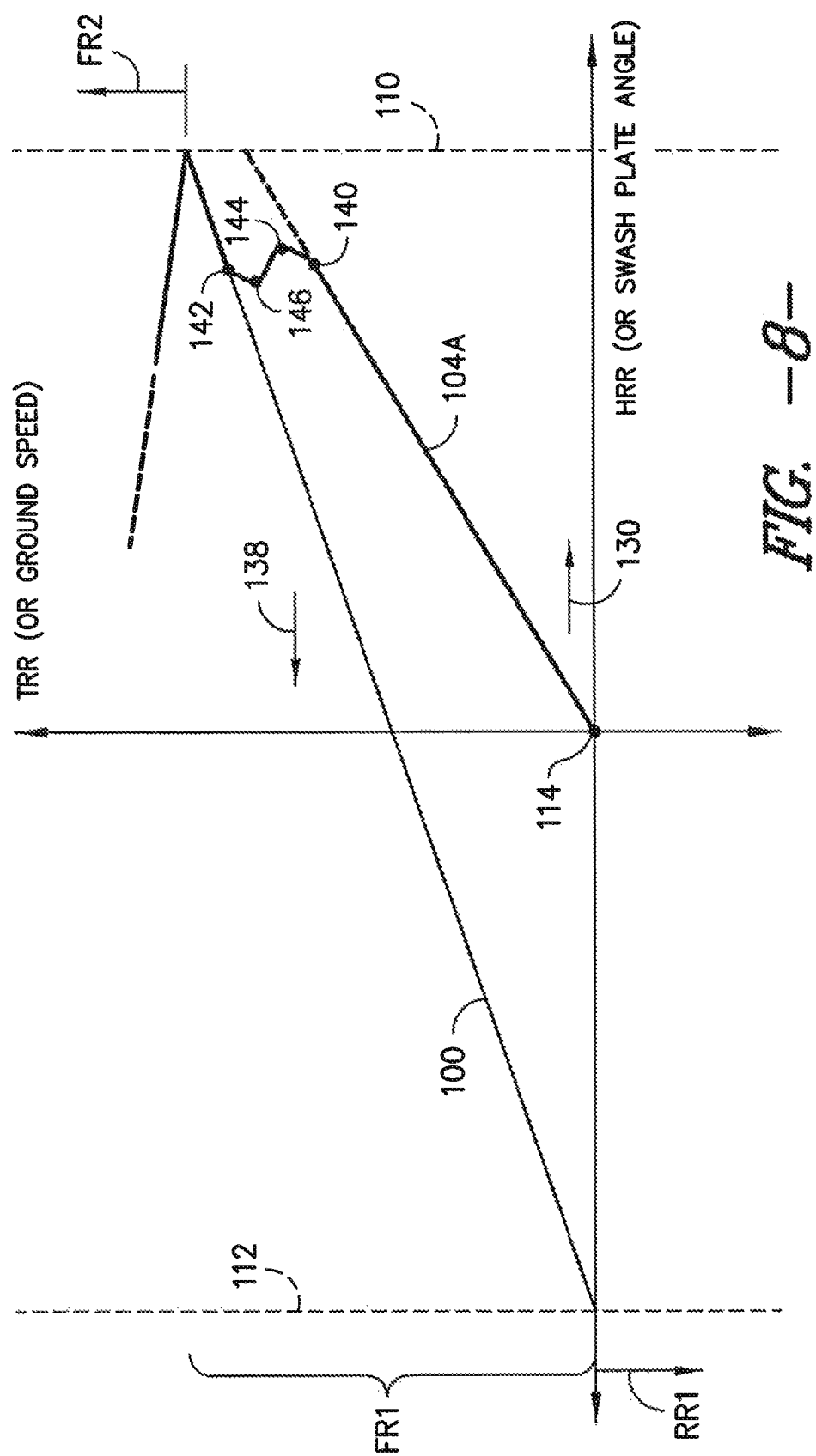
FIG. -8-

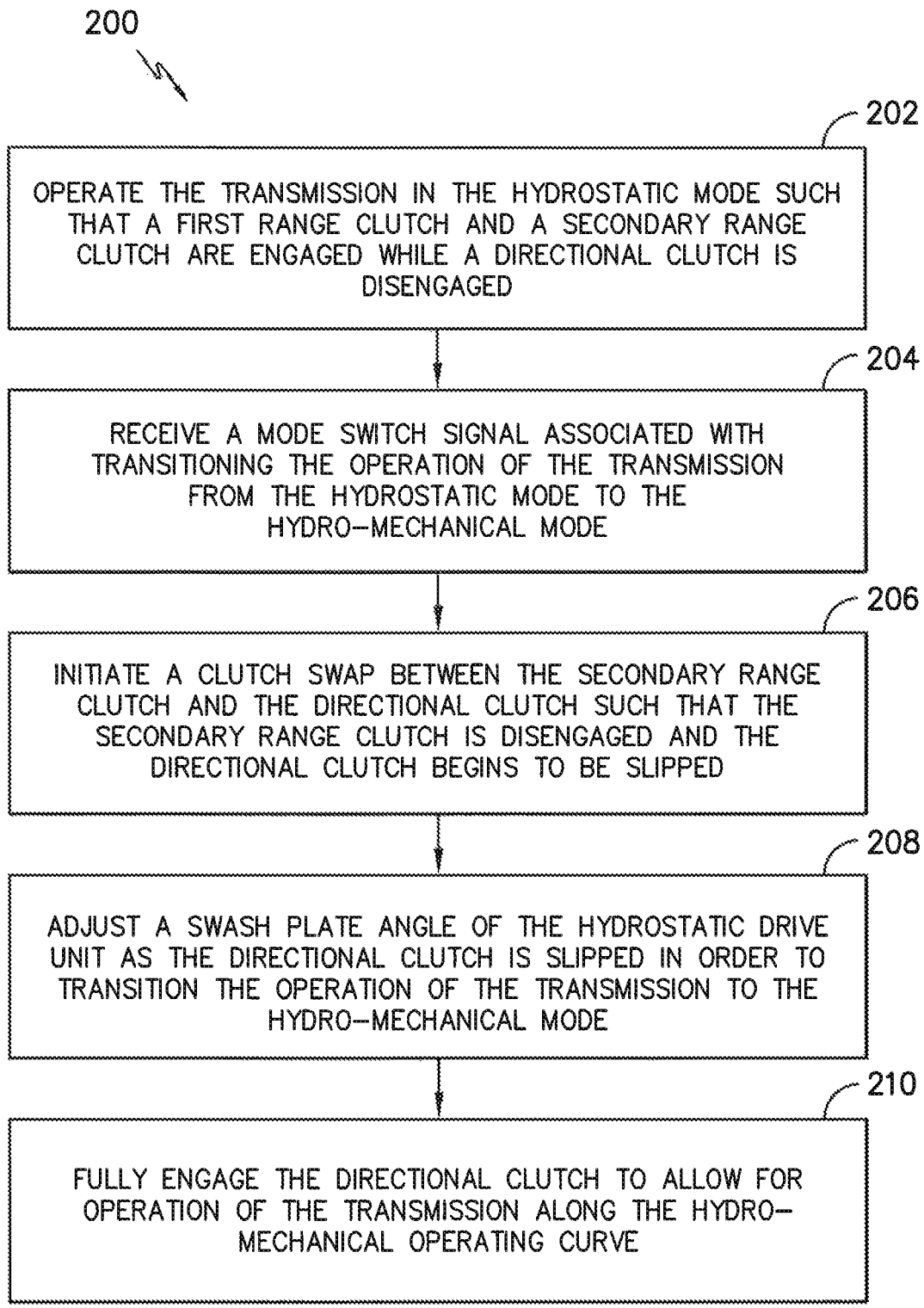

SYSTEM AND METHOD FOR CONTROLLING A CONTINUOUSLY VARIABLE TRANSMISSION WHEN TRANSITIONING OPERATION FROM A HYDROSTATIC MODE TO A HYDRO-MECHANICAL MODE

FIELD OF THE INVENTION

The present subject matter relates generally to work vehicles and, more particularly, to a system and method for controlling a continuously variable transmission of a work vehicle when transitioning its operation from a hydrostatic mode to a hydro-mechanical mode.

BACKGROUND OF THE INVENTION

Work vehicles, such as tractors and other agricultural vehicles, having continuously variable transmissions (CVTs) are well known. CVTs generally allow for enhanced performance by providing continuous and smooth gear ratio changes. Typically, CVTs have a hydro-mechanical configuration such that power from the engine flows in parallel through both a hydrostatic power unit and a planetary power unit of the CVT. During operation, fluid displacement of the hydrostatic power unit is varied to continuously change the output to input ratio of the transmission (i.e., the transmission ratio). This is accomplished by adjusting the angle of a swash plate of a variable displacement fluid pump and/or motor of the hydrostatic power unit.

CVTs are often configured with the capability to perform shuttle shifts, wherein the direction of travel of the work vehicle may be reversed without requiring the operator to change gears or use the clutch. However, the hydrostatic power units utilized within many CVTs are configured such that, at a zero ground speed for the work vehicle, the swash plate is at full displacement or near full displacement, in one direction or the other, depending on the range selected, direction of travel and possibly other factors. Thus, when shuttle shifting, the work vehicle is often required to come to a complete stop as the swash plate is moved across its full range of travel in order to allow the direction of the work vehicle to be reversed. Such stopping of the work vehicle is undesirable in most instances.

To avoid stopping the work vehicle, control strategies have also been developed that provide for the on-coming directional clutch to be slipped while the swash plate angle is being adjusted. However, such a control strategy reduces the efficiency of the work vehicle due to the amount of energy dissipated while the clutch is being slipped. In addition, the thermal cycling caused by clutch slipping can result in significant damage to the directional clutches.

Accordingly, a system and method that provides for a CVT of a work vehicle to be operated within a pure hydrostatic mode to allow for seamless shuttle shifting and high efficiency low speed operation would be welcomed in the art. In addition, a system and method for controlling the operation of the CVT as it is transitioned between the hydrostatic mode and its normal hydro-mechanical mode would also be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a continuously variable transmission of a work vehicle when transitioning the transmission from operation within a hydrostatic mode to operation within a hydro-mechanical mode. The method may generally include operating the transmission in the hydrostatic mode such that a first range clutch and a secondary range clutch of the transmission are engaged and a directional clutch of the transmission is disengaged, wherein the first range clutch is associated with operating the transmission within a first speed range. In addition, the method may include receiving a mode switch signal associated with transitioning the operation of the transmission from the hydrostatic mode to the hydro-mechanical mode while a ground speed of the work vehicle is below a maximum ground speed associated with the first speed range, initiating a clutch swap between the secondary range clutch and the directional clutch such that the secondary range clutch is disengaged and the directional clutch begins to slip. The method may also include adjusting a swash plate angle of a hydrostatic drive unit of the transmission as the directional clutch is slipped in order to transition the operation of the transmission to an operating point defined along a hydro-mechanical operating curve associated with the first speed range for the hydro-mechanical mode and fully engaging the directional clutch to allow operation of the transmission along the hydro-mechanical operating curve.

In another aspect, the present subject matter is directed to a work vehicle. The work vehicle may generally include a continuously variable transmission having a hydrostatic drive unit, a first range clutch, a secondary range clutch and a directional clutch. The transmission may be configured to operate in a hydrostatic mode and a hydro-mechanical mode. In addition, the work vehicle may include a controller configured to control the operation of the transmission. The controller may include a processor and associated memory. The memory may store computer-readable instructions that, when executed by the processor, configure the controller to operate the transmission in the hydrostatic mode such that the first range clutch and the secondary range clutch are engaged and the directional clutch is disengaged. The first range clutch may be associated with operating the transmission within a first speed range. In addition, the controller may be configured to receive a mode switch signal associated with transitioning the operation of the transmission from the hydrostatic mode to the hydro-mechanical mode while a ground speed of the work vehicle is below a maximum ground speed associated with the first speed range and initiate a clutch swap between the secondary range clutch and the directional clutch such that the secondary range clutch is disengaged and the directional clutch begins to slip. The controller may also be configured to adjust a swash plate angle of the hydrostatic drive unit as the directional clutch is slipped in order to transition the operation of the transmission to an operating point defined along a hydro-mechanical operating curve associated with the first speed range for the hydro-mechanical mode and fully engage the directional clutch to allow for operation of the transmission along the hydro-mechanical operating curve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of a continuously variable transmission suitable for use with the work vehicle shown in FIG. 1;

FIG. 3 illustrates a graphical representation of one embodiment of the relationship between the transmission ratio and the hydrostatic power unit ratio for the transmission shown in FIG. 2, particularly illustrating the four forward and reverse speed ranges obtained when the transmission is operating in its hydro-mechanical operating mode;

FIG. 4 illustrates another view of a graphical representation of one embodiment of the relationship between the transmission ratio and the hydrostatic power unit ratio for the forward and reverse low speed ranges of the transmission shown in FIG. 2, particularly illustrating the relationship of such ratios when the transmission is operating in its hydro-mechanical operating mode and in its hydrostatic operating mode;

FIG. 5 illustrates a graphical representation of one example showing how the operation of the transmission shown in FIG. 2 may be transitioned from the hydrostatic operating mode to the hydro-mechanical operating mode, particularly illustrating the transition occurring at the maximum ground speed for the low forward speed range when the hydrostatic mode is provided by engaging the first and second range clutches of the transmission;

FIG. 6 illustrates a graphical representation of another example showing how the operation of the transmission shown in FIG. 2 may be transitioned from the hydrostatic operating mode to the hydro-mechanical operating mode, particularly illustrating the transition occurring at a ground speed below the maximum speed for the low forward speed range when the hydrostatic mode is provided by engaging the first and second range clutches of the transmission;

FIG. 7 illustrates a graphical representation of a further example showing how the operation of the transmission shown in FIG. 2 may be transitioned from the hydrostatic operating mode to the hydro-mechanical operating mode, particularly illustrating the transition occurring at a ground speed below the maximum speed for the low forward speed range when the hydrostatic mode is provided by engaging the first and fourth range clutches of the transmission;

FIG. 8 illustrates a graphical representation of yet another example showing how the operation of the transmission shown in FIG. 2 may be transitioned from the hydrostatic operating mode to the hydro-mechanical operating mode, particularly illustrating the transition occurring at a ground speed below the maximum speed for the low forward speed range when the hydrostatic mode is provided by engaging the first and fourth range clutches of the transmission; and FIG. 9 illustrates a flow diagram of one embodiment of a method for controlling the operation of a transmission at it is transitioned from the hydrostatic operating mode to the hydro-mechanical operating mode.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a continuously variable transmission (CVT) of a work vehicle when transitioning the transmission between separate operating modes. Specifically, in several embodiments, the transmission may be configured to operate in either a hydro-mechanical mode or a pure hydrostatic mode. In the hydro-mechanical mode, power is split between a hydrostatic power unit and a planetary power unit of the transmission, which provides a highly efficient operating mode for many farming applications due to the increased torque that can be achieved. In contrast, with the hydrostatic mode, power is supplied solely through the hydrostatic unit, which results in lower output torques since the torque output from the hydrostatic unit is limited by its relief pressure. However, the hydrostatic mode may provide increased efficiency at low speeds within the low forward and reverse speed ranges of the transmission and, thus, may be desirable for use in low speed, low torque farming applications, such as grain cart work. In addition, the hydrostatic mode provides a means for seamless shuttle shifting between forward and reverse without the need for clutch slipping. Moreover, the hydrostatic mode also requires less energy from the engine when shuttling, thereby resulting in less engine lug and, thus, providing more available power for changing the travel direction of the vehicle. Further, the hydrostatic mode may also result in quieter operation at ground speeds at and around zero.

In several embodiments, the separate operating modes may be selectable by the operator via one or more input devices contained within the vehicle's cab. For instance, the operator may be provided with one or more input buttons and/or any other suitable input device(s) for selecting either the hydrostatic mode or the hydro-mechanical mode. Thus, when the operator desires to operate the transmission within the one of the operating modes, he/she may simply provide a suitable operator input to the vehicle's controller. The controller may then control the operation of the transmission accordingly to allow for operation within the selected mode. In addition, the user interface within the cab may also include a visual indicator (e.g., a LED light, message window and/or the like) that provides the operator with an indication of which operating mode is currently selected.

Additionally, in several embodiments, the transmission may only be configured to operate within the hydrostatic mode in the vehicle's low speed range (e.g., the low forward speed range and the low reverse speed range). Thus, when operating within the hydrostatic mode, the vehicle controller may be configured to automatically switch operation of the transmission to the hydro-mechanical mode when the maximum ground speed for the low speed range is reached. For instance, at such maximum ground speed, the controller may be configured to swap the first range clutch with the appropriate directional clutch to allow the vehicle's ground speed to be further increased along the second speed range within the hydro-mechanical mode.

Moreover, in several embodiments, the operation of the transmission may also be switched from the hydrostatic mode to the hydro-mechanical mode at ground speeds lower than the maximum ground speed for the low speed range. For instance, if the operator feels that more output torque is needed, he/she may provide a suitable operator input to switch the operating mode from the hydrostatic mode to the hydro-mechanical mode. As will be described below, the vehicle controller may then control the transmission in a manner that allows for its operation to be properly transitioned to the hydro-mechanical mode. In addition to such operator-initiated switches, the vehicle controller may also be configured to automatically switch operation of the transmission from the hydrostatic mode to the hydro-mechanical mode at ground speeds lower than the maximum ground speed for the low speed range. For instance, as will be described below, the controller may be configured to monitor a drivetrain torque of the work vehicle using one or more suitable sensors. If the drivetrain torque exceeds a given threshold, the controller may be configured to automatically switch operation to the hydro-mechanical mode to allow for the generation of additional output torque.

It should be appreciated that, based on the specific configuration of the CVT in use, the means for operating the transmission within the hydrostatic mode may vary. For instance, given the configuration of the transmission described herein, the transmission may be operated within the hydrostatic mode by disengaging the directional clutches and engaging a combination of the first and second range clutches or a combination of the first and fourth range clutches. As will be described below, the different combinations of range clutches may be provide for varied performance within the hydrostatic mode.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller. The work vehicle 10 may also include various other input devices, such as a speed control lever or any other suitable input device known in the art.

Moreover, the work vehicle 10 may include an engine 23 and a transmission 24 mounted on the chassis 16. The transmission 24 may be operably coupled to the engine 23 and may provide variably adjusted gear ratios for transferring engine power to the wheels 14 via an axle/differential 26. The engine 23, transmission 24, and axle/differential 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 2, a schematic diagram of one embodiment of a continuously variable transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10.

The hydrostatic power unit 30 of the transmission 10 may generally include a fluid pump 36 coupled by fluid conduits 38 in a closed loop to a fluid motor 40. The motor 40 may be coupled to the engine 23 via an input gear N6. Specifically, as shown in FIG. 2, power may be transmitted to the hydrostatic power unit 30 by a driven gear N4 mounted on a forward shaft 42 of the transmission 10 and engaged with the input gear N6. In addition, an output gear N10 for the hydrostatic power unit 30 may be connected to a ring gear NR of the planetary power unit 32 via gears N11 and N12. A power take off (PTO) of the vehicle 10 may also be coupled to the engine 23 through the forward shaft 42 (e.g., by coupling a PTO gear reduction N26 to the forward shaft 42, which is coupled to the engine 23 via gears N5 and N1.

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) 45 and associated memory device(s) 47 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 47 of the controller 44 may generally comprise memory element(s) including, but not limited to, computer readable medium (e.g., random access memory (RAM), including dynamic RAM (DRAM) and static RAM (SRAM)), computer readable non-volatile medium (e.g., a flash memory) and/or other suitable memory elements. Such memory device(s) 47 may generally be configured to store suitable computer-readable instructions that, when implemented by the processor(s) 45, configure the controller 44 to perform various computer-implemented functions, such as the method 200 described below with reference to FIG. 9. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shaft 50. As shown, the planetary input shaft 50 may be coupled to the engine 23 via a forward directional clutch 52 or a reverse directional clutch 54. In addition, the planetary power unit 32 may be configured to be selectively coupled to the load L, coupled to the hydrostatic power unit 30 and selectively coupled to the engine 23, all under automatic control of the controller 44. For example, for coupling the planetary power unit 32 to the load L, the transmission 24 may include an output shaft 56 coupled to the load L which carries an input gear N18 engaged with an output gear N17 on a range 1/2 shaft 58 of the range gear set 34 and a gear N22 engaged with a gear N19 on a range 3/4 shaft 60 of the range gear set 34. The range 1/2 shaft 58 may, in turn, be coupled to the planetary power unit 32 via automatic operation of range selectors or clutches R1 and R2 for power flow through gears N13 and N14, or N15 and N16, respectively. Similarly, the range 3/4 shaft 60 may be coupled to the planetary power unit 32 via range selectors or clutches R3 and R4 for power flow via gears N13 and N20, or N15 and N21, respectively. The range 1/2 and 3/4 shafts 58, 60 may also be simultaneously coupled to the planetary power unit 32 to provide dual power flow. It should be appreciated that operation of the various clutches (e.g., the forward directional clutch 52, the reverse directional clutch 54, and range clutches R1, R2, R3 and R4) may be automatically controlled by the controller 44 using suitable actuators 62 (e.g., hydraulic pistons) communicatively coupled to the controller 44 via suitable communicative links 46.

The controller 44 may also be communicatively coupled to a swash plate actuator 64 for automatically controlling the position or angle of the swash plate 48 of the pump 36. For example, the actuator 64 may be configured to move the swash plate 48 across a range of angles in response to control signals (e.g., current commands) received from the controller 44.

In addition, the controller 44 may be coupled to any number of sensors for monitoring various operating parameters of the work vehicle 10. For example, as shown in FIG. 2, the controller 44 may be communicatively coupled to one or more pressure transducers or sensors 66 for sensing the pressure within the conduits 38 connecting the pump 36 to the motor 40 and/or for sensing the pressure of the hydraulic fluid within the various clutches of the transmission 24. As is generally understood, the pressure measurements provided by the sensors 66 may be utilized to calculate or estimate a drivetrain torque of the work vehicle 10. Alternatively, the drivetrain torque may be calculated using measurements provided from any other suitable sensors. For instance, in several embodiments, the controller 44 may also be coupled to one or more engine torque sensors 90 (e.g., the torque sensor(s) provided within the engine governor) for monitoring the engine torque, one or more transmission torque sensors 92 for monitoring any torques transmitted through and/or output from the transmission 24 and/or one or more axle/differential torque sensors 94 26 for monitoring any torque transmitted through the axle/differential 26.

It should be appreciated that the controller 44 may also be coupled to various other sensors, such as speed sensors 68 for sensing the rotational speeds of the various shafts of the transmission 24 (e.g., by sensing the motor speed of the fluid motor 40), temperature sensors for sensing the temperature of one or more fluids within the transmission 24 and/or any other suitable sensors.

Additionally, as shown in FIG. 2, the controller 44 may also be communicatively coupled to one or more operator-controlled input device(s) positioned within the cab 18 via a suitable communicative link 46. For example, the controller 44 may be coupled to the FRNP lever 20, the clutch pedal 21, the display panel 22 and/or any other suitable input device of the vehicle 10 (e.g., the speed control lever or pedal, the engine throttle lever, the neutral button and/or any other suitable lever, pedal, button or control panel of the vehicle 10). As indicated above, one or more of the vehicle's input devices may allow for the operator to select whether the transmission 24 is operated within its hydro-mechanical mode or its hydrostatic mode. For instance, one or more input buttons may be coupled to the controller 44 to allow the operator select the particular operating mode for the transmission 24.

During operation, the transmission 24 may be operated in the hydro-mechanical mode by engaging either the reverse directional clutch 54 to the planetary power unit 32 via gears N1, N3, N5 and N7 or the forward directional clutch 52 to the power planetary power unit 32 via gears N1, N8, and N2 while also engaging one of the range clutches R1, R2, R3, R4. Alternatively, the transmission 24 may be operated in the hydrostatic mode by disengaging both of the directional clutches 52, 54 and by engaging a combination of two of the range clutches R1, R2, R3, R4 (e.g., the first and second range clutches R1, R2 or the first and fourth range clutches R1, R4).

When in the hydro-mechanical mode, the transmission 24 may provide a seamless transition between ranges to provide work/road configurations as desired. In particular, speed changes from the minimum speed to the maximum speed within each speed range of the transmission 24 may be achieved in a smooth and continuous manner by automatically changing the swash plate angle of the pump 36 via control signals transmitted from the controller 44. For each speed range, a significant range of travel of the swash plate 48 may be used. For example, as will be described below with reference to FIG. 3, the swash plate 48 may be at one end of its range of travel for a zero ground speed within the low speed range, may be at the other end of its range of travel for the maximum speed for the low speed range and may be at a zero angle or neutral position within its range of travel for an intermediate speed for the low speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular CVT configuration shown in FIG. 2, but, rather, the present subject matter may be advantageously used with various different CVT configurations.

Referring now to FIG. 3, a graphical representation of one embodiment of the relationship between the transmission reciprocal ratio (i.e., the transmission output speed divided by the engine speed (or the transmission input speed)), denoted TRR, and the hydrostatic power unit ratio (motor speed/pump speed), denoted HRR, is illustrated for when the transmission 24 is operating within the hydro-mechanical mode. As shown, the transmission 24 includes four selectable forward speed ranges and four selectable reverse speed ranges of operation: namely, forward speed range 1 or low (denoted FR1); forward speed range 2 (denoted FR2); forward speed range 3 (FR3); forward speed range 4 (FR4); reverse speed range 1 (RR1); reverse speed range 2 (RR2); reverse speed range 3 (RR3); and reverse speed range 4 (RR4). As is generally understood, the HRR is directly related to the swash plate angle of the pump 36. Accordingly, as the swash plate 48 is moved, the transmission ratio, and, thus, the ground speed of the work vehicle 10, may be varied across a given speed range.

When operating in the hydro-mechanical mode, it should be noted that, for each of the speed ranges, the zero angle position of the swash plate 48 lies between the maximum swash plate angles in the opposite directions of movement of the swash plate 48. Thus, as shown in FIG. 3, at the lowest HRR for the forward speed range FR1, the swash plate 48 may be at or near its maximum angle in the left hand direction (which is also the zero speed ratio for the transmission 24 for the forward direction). Similarly, at the highest ratio for the forward range FR1, the swash plate may be at or near its maximum angle in the opposite direction (i.e., in the right hand direction). It should be appreciated that, when the term "maximum" angle is used herein, some marginal amount of swash plate movement may still remain so that zero vehicle speed can be achieved under conditions such as, but not limited to, leakage in the hydrostatic power unit 30, that may cause the motor 40 to rotate more slowly for a given swash plate angle.

In addition, as shown in FIG. 3, to transition from zero speed in the forward speed range FR1 to zero speed in the lowest speed range in the reverse direction (i.e., reverse speed range RR1), the swash plate 48 must travel substantially along its entire range of movement, as depicted by distance ROM. Thus, to perform a forward-to-reverse shuttle shift when operating in the hydro-mechanical mode, the swash plate 48 must be moved across the distance ROM in order to transition from the forward range FR1 to the reverse range RR1. As a result, the work vehicle 10 must be stopped temporarily and the parking brake 70 engaged as the swash plate 48 is repositioned, thereby preventing a seamless transition between the forward and reverse travel directions. Alternatively, shuttle shifting may be accomplished within the hydro-mechanical mode by slipping the oncoming directional clutch while the swash plate 48 is being repositioned, which may allow for shuttle shifts to be performed without stopping the vehicle 10. However, such clutch slipping is inefficient due to the amount of energy dissipated via heat generation and also results in a reduction in the component life of the directional clutch(es) 52, 54 due to increased clutch wear.

Referring now to FIG. 4, the low speed ranges of FIG. 3 (i.e., the forward speed range FR1 and the reverse speed range R1) are shown in order to illustrate the relationship between the transmission reciprocal ratio (TRR) and the hydrostatic power unit ratio (HRR) when the transmission 24 is operating within the hydro-mechanical mode versus the purely hydrostatic mode. Specifically, as shown in FIG. 4, first and second hydro-mechanical curves 100, 102 represent the operating curves providing for transmission operation in the hydro-mechanical mode across the low forward and reverse speed ranges FR1, RR1, respectively. Additionally, a hydrostatic curve 104 (shown in dashed lines) represents the operating curve providing for transmission operation within the hydrostatic mode across the low forward and reverse speed ranges FR1, RR1.

As indicated above, the transmission 24 may be configured to operate within the hydrostatic mode across the low speed ranges FR1, RR2 by disengaging the directional clutches 52, 54 and by engaging both the first range clutch R1 and another range clutch. For example, in the illustrated embodiment, the hydrostatic mode is achieved by engaging the first and second range clutches R1, R2. However, given the configuration of the transmission 24 shown in FIG. 2, the hydrostatic mode may also be achieved by engaging the first and fourth range clutches R1, R4 (the operation of which will generally be described below with references to FIGS. 7 and 8). Regardless, by operating within the hydrostatic mode, shuttle shifts may be performed without requiring clutch swapping by simply adjusting the swash plate angle. Specifically, in the hydrostatic mode, the zero angle position for the swash plate 48 may correspond to a zero ground speed for the work vehicle 10. Thus, by simply adjusting the swash plate angle across the zero angle position, the travel direction of the vehicle 10 may be reversed.

For example, in several embodiments, the swash plate 48 may have a travel range defined between a first end position (indicated by dashed line 110) and a second end position (indicated by dashed line 112). As shown in FIG. 4, to reduce the vehicle's ground speed from the maximum speed for the forward speed range FR1 to a zero ground speed when operating in the hydro-mechanical mode, the swash plate 48 must be moved substantially across its entire travel range along the first hydro-mechanical curve 100 from the first end position 110 to the second end position 112. Similarly, to increase the vehicle's ground speed from a zero ground speed to the maximum speed for the reverse speed range RR1, the swash plate 48 must be moved substantially across its entire travel range along the second hydro-mechanical curve 102 from the first end position 110 to the second end position 112.

In contrast, when operating in the hydrostatic mode, movement of the swash plate 48 from the first end position 110 to the second end position 112 may result in the vehicle's ground speed being adjusted from the maximum speed for the forward speed range FR1 to the maximum speed for the reverse speed range RR1, with a zero ground speed being achieved at the zero angle position for the swash plate 48 (indicated at point 114). Thus, by adjusting the angle of the swash plate 48 across its zero angle position 114, the travel direction of the work vehicle 10 may be seamlessly transitioned from forward to reverse and vice versa.

In addition, when engaging the first and second range clutches R1, R2 for the hydrostatic mode, the operation of the transmission 24 may also be seamlessly transitioned between the hydrostatic mode and the hydro-mechanical mode as the transmission 24 is shifted from the low speed ranges FR1, RR1 to the adjacent higher speed ranges (e.g., FR2 and RR2). For example, FIG. 5 illustrates the transition from the hydrostatic mode to the hydro-mechanical mode as the transmission 24 is shifted from operating within the low forward speed range FR1 to the second forward speed range FR2. As shown, since the swash plate 48 must be moved to the same position (i.e., the first end position 110) to achieve the maximum ground speed for the low forward speed range FR1 regardless of whether the transmission 24 is being operated within the hydro-mechanical mode (i.e., along curve 100) or the hydrostatic mode (i.e., along curve 104), the operation of the transmission 24 may be switched from the hydrostatic mode to the hydro-mechanical simply by swapping the first range clutch R1 and the forward directional clutch 52 at point 120.

Specifically, as shown in FIG. 5, with the first and second range clutches R1, R2 engaged, the transmission 24 may be operated within the hydrostatic mode along curve 104 such that the vehicle ground speed is increased from a zero ground speed to the maximum speed for the low speed range FR1 as the position of the swash plate 48 is moved from the zero angle position 114 to the first end position 110. During such time, the forward directional clutch 52 may be pre-filled in anticipation of the clutch swap (i.e., by filling the clutch 52 to just below its "kiss point" so that it may be rapidly engaged). Thus, when the maximum speed is reached at point 120, the first range clutch R1 may be disengaged and the forward directional clutch 52 may be engaged in order to transition into the hydro-mechanical mode. Thereafter, the swash plate angle may be further adjusted (e.g., along curve 122) to increase the vehicle's ground speed within the forward speed range FR2.

It should be appreciated that, when swapping the first range clutch R1 and the forward directional clutch 52, any suitable shifting control strategies known in the art may be utilized to ensure that the swap is performed as smoothly as possible. For instance, in one embodiment, the timing of the shift may be adjusted to account for the commanded acceleration of the work vehicle 10. In addition, the drivetrain torque for the work vehicle 10 may be calculated (e.g., using the sensor measurements described above) and utilized as a means for controlling the hydraulic pressure within the forward directional clutch 52 to allow for no interruption in output torque and/or no changes in ground speed as the directional clutch 52 is being engaged.

It should also be appreciated that a similar methodology may be used to transition the operation of the transmission 24 between the hydrostatic and hydro-mechanical modes when the vehicle 10 is traveling in the reverse direction. Specifically, referring back to FIG. 4, at the point at which the maximum speed for the reverse speed range RR1 is reached (i.e., point 124), the first range clutch R1 may be disengaged and the reverse directional clutch 54 may be engaged in order to transition into the hydro-mechanical mode. Thereafter, the swash plate angle may be further adjusted in the direction of its zero angle position 114 to increase the vehicle's ground speed within the reverse speed range RR2.

Additionally, as indicated above, the output torque of the transmission 24 may be limited when operating in the hydrostatic mode. Thus, it may often be necessary or desirable to shift from the hydrostatic mode to the hydro-mechanical mode at a ground speeds lower than the maximum speed associated with the low forward speed range FR1 (or the low reverse speed range RR1) to allow additional output torque to be provided at such lower speeds. For instance, FIG. 6 illustrates one example showing how the operation of the transmission 24 may be shifted from the hydrostatic mode to the hydro-mechanical mode at an intermediate ground speed for the low speed range FR1 (i.e., when the swash plate 48 is positioned at an intermediate position defined between the zero angle position 114 and the first end position 110).

As shown in FIG. 6, when operating in the hydrostatic mode, the vehicle's ground speed may be increased from a zero ground speed along curve 104 by adjusting the position of the swash plate 48 in a first direction (indicated by arrow 130) between the zero angle position 114 and the first end position 110. However, at point 132, a mode switch command or signal is received instructing the controller 44 to switch the operation of the transmission 24 from the hydrostatic mode to the hydro-mechanical mode. As will be described below, such a mode switch signal may be received, for example, in response to an operator input requesting that the transmission 24 be switched to the hydro-mechanical mode. Alternatively, the mode switch signal may be generated automatically by the controller 44, such as when the controller 44 determines that the drivetrain torque of the work vehicle 10 exceeds a given torque threshold.

Upon receipt of the mode switch signal at point 132, the second range clutch R2 may be disengaged and the forward directional clutch 52 may begin to be engaged. For instance, as indicated above, the forward directional clutch 52 may be pre-filled as the swash plate 48 is being moved during operation within the hydrostatic mode. Thus, when the mode switch signal is received, the hydraulic pressure within the forward directional clutch 52 may only need to be slightly increased to allow the clutch 52 to begin to slip as the second range clutch R2 is being disengaged. Thereafter, the hydraulic pressure within the forward directional clutch 52 may be increased until the clutch 52 is fully engaged (i.e., at point 134).

Additionally, as shown in FIG. 6, while the forward directional clutch 52 is being slipped (i.e., between points 132 and 134), the position of the swash plate 48 may be adjusted as needed in order to transition the operation of the transmission 24 from an operating point on the hydrostatic curve 104 (e.g., at point 132) to an operating point on the first hydro-mechanical curve 100 (e.g., at point 134). In doing so, it may be desirable to initially continue to increase the swash plate angle in the first direction 130 until the hydraulic pressure within the forward directional clutch 52 is sufficiently increased to counteract any reaction torque resulting from the movement of the swash plate 48. For example, as shown in FIG. 6, the swash plate angle may continue to be adjusted in the first direction 130 for a short period time between point 132 and point 136 to allow the pressure within the forward directional clutch 52 to be ramped up. Thereafter, the swash plate angle may be adjusted in a second direction 138 until the forward directional clutch 52 is fully engaged, at which point the operation of the transmission 24 may be fully transitioned to the hydro-mechanical mode. The position of the swash plate 48 may then be adjusted again in the first direction 130 along curve 100 to allow the ground speed of the work vehicle 100 to be increased to the maximum speed for the low speed range FR1.

It should be appreciated that, when performing the mode switch shown in FIG. 6, any suitable shifting control strategies known in the art may be utilized to ensure that the switch is performed as smoothly as possible. For instance, as indicated above, the drivetrain torque for the work vehicle 10 may be calculated and utilized as a means for controlling the hydraulic pressure within the forward directional clutch 52 to provide for no interruption in output torque and/or no changes in the ground speed as the directional clutch 52 is being engaged. In addition, suitable control strategies may be used to control the switch when the operator has commanded acceleration or if the engine 24 is lugging. Similarly, the switch may be delayed or its timing adjusted if the drivetrain torque is too high and/or the ground speed is too low.

It should also be appreciated that a similar methodology may also be used to transition the operation of the transmission 24 between the hydrostatic and hydro-mechanical modes when the vehicle 10 is traveling in reverse and a mode switch signal is received while the vehicle's ground speed is less than the maximum speed associated with the low speed range RR1. Specifically, referring back to FIG. 4, when the mode switch signal is received, the second range clutch R2 may be disengaged and the reverse directional clutch 54 may be partially engaged such that the clutch 54 is slipped as the position of the swash plate 48 is being adjusted to allow the operation of the transmission 24 to be transitioned from an operating point along the hydrostatic curve 104 to an operating point along the second hydro-mechanical curve 102. Once the reverse directional clutch 54 is fully engaged, the swash plate angle may then be adjusted in the direction of the second end position 112 to allow the ground speed of the work vehicle 10 to be increased to the maximum speed for the low speed range RR1.

Referring now to FIGS. 7 and 8, examples are illustrated showing the transition between the hydrostatic and hydro-mechanical modes when the first and fourth range clutches R1, R4 are engaged in order to provide operation within the hydrostatic mode. As indicated above, depending on the combination of range clutches used, the performance of the transmission 24 may slightly vary within the hydrostatic mode. For instance, using the first and fourth range clutches R1, R4, a slightly higher output torque may be achieved than when the first and second range clutches R1, R2 are used. In addition, the magnitude of the change in ground speed obtained with each incremental change in the swash plate angle is reduced when using the first and fourth range clutches R1, R4 to provide operation within the hydrostatic mode. For instance, as shown in FIGS. 7 and 8, the first and fourth range clutches R1, R4 provide for a hydrostatic operating curve 104A that results in a ground speed that is lower than the maximum ground speed for the low speed range FR1 when the swash plate is moved to its first end position 110. As a result, unlike the synchronous range shift described above with reference to FIG. 5, a synchronous shift from the first and fourth range clutches R1, R4 to the second range clutch R2 and the forward directional clutch 52 is not available. Thus, the operation of the transmission 24 may, instead, be transitioned to an operating point along the first hydro-mechanical curve 100 in order to transition from the hydrostatic mode to the hydro-mechanical mode. Once transitioned, the swash plate angle may then be adjusted to the first end position 110 to achieve the maximum ground speed for the low speed range FR1. If desired, a synchronous shift to the second speed range FR2 may then be performed using known control strategies.

When transitioning from the hydrostatic mode to the hydro-mechanical mode with the first and fourth range clutches R1, R4 engaged, the shifting methodology may generally vary depending on the commanded acceleration for the work vehicle 10. Specifically, FIG. 7 illustrates an example showing the transition when a low acceleration is commanded. Additionally, FIG. 8 illustrates an example showing the transition when a high acceleration is commanded.

As particularly shown in FIG. 7, when operating in the hydrostatic mode, the ground speed may be increased from a zero ground speed along curve 104A by adjusting the position of the swash plate 48 in a first direction 130 between the zero angle position 114 and the first end position 110. However, at point 140, a mode switch command or signal is received instructing the controller 44 to switch the operation of the transmission 24 from the hydrostatic mode to the hydro-mechanical mode. Upon receipt of the mode switch signal, the fourth range clutch R4 may be disengaged and the forward directional clutch 52 may begin to be engaged. For instance, as indicated above, the forward directional clutch 52 may be pre-filled as the swash plate 48 is being moved during operating within the hydrostatic mode. Thus, when the mode switch signal is received, the hydraulic pressure within the forward directional clutch 52 may only need to be slightly increased to allow the clutch 52 to begin to slip as the fourth range clutch R4 is being disengaged. Thereafter, the hydraulic pressure within the forward directional clutch 52 may be increased until the clutch 52 is fully engaged (i.e., at point 142).

Additionally, while the forward directional clutch 52 is being slipped (i.e., between points 140 and 142), the position of the swash plate 48 may be adjusted as needed in order to transition the operation of the transmission from an operating point on the hydrostatic curve 104A (e.g., at point 140) to an operating point on the first hydro-mechanical curve 100 (e.g., at point 142). For example, as shown in FIG. 7, due to a low acceleration being commanded, the swash plate angle may simply be adjusted in a second direction 138 until the forward directional clutch 52 is fully engaged, at which point the operation of the transmission 24 may be fully transitioned to the hydro-mechanical mode. The position of the swash plate 48 may then be adjusted again in the first direction 130 along curve 100 to allow the ground speed of the work vehicle 10 to be increased to the maximum speed for the low speed range FR1.

Referring now to FIG. 8, it should be appreciated that the shifting methodology for transitioning from the hydrostatic mode to the hydro-mechanical mode at high accelerations may share certain similarities to the shifting methodology described above with reference to FIG. 7. For instance, as shown in FIG. 8, when operating in the hydrostatic mode, the ground speed may be increased from a zero ground speed along curve 104A by adjusting the position of the swash plate in a first direction 130 between the zero angle position 114 and the first end position 110. Moreover, upon receipt of the mode switch signal (e.g., at point 140), the fourth range clutch R4 may be disengaged and the forward directional clutch 52 may begin to be engaged. Thereafter, the hydraulic pressure within the forward directional clutch 52 may be increased until the clutch 52 is fully engaged (i.e., at point 142).

However, unlike the shifting example shown in FIG. 7, the manner in which the swash plate angle is adjusted while the forward directional clutch 52 is being slipped (i.e., between points 140 and 142) may differ given the high acceleration commanded for the work vehicle 10. Specifically, as shown in FIG. 8, the swash plate angle may be initially adjusted in the first direction 130 for a short period of time between point 140 and point 144 to allow the pressure within the forward directional clutch 52 to be ramped up. Thereafter, the swash plate angle may be adjusted in a second direction 138 until the amount of slippage across the forward directional clutch 52 falls below a predetermined slip threshold (indicted at point 146). At this point 146, the rate of change of the swash plate angle may be slowed and eventually stopped to allow the direction of movement of the swash plate 48 to be reversed from the second direction 138 back to the first direction 130. As such, when the slippage across the forward directional clutch 52 goes to zero (i.e., at point 142), the swash plate 48 may be moving in the appropriate direction and at the appropriate rate to allow for a seamless transition into the hydro-mechanical mode. The position of the swash plate 48 may then be further adjusted in the first direction 130 along curve 100 to allow the ground speed of the work vehicle 10 to be increased to the maximum speed for the low speed range FR1.

It should be appreciated that, when performing the mode switches shown in FIGS. 7 and 8, any suitable shifting control strategies known in the art may be utilized to ensure that each switch is performed as smoothly as possible, such as by using the monitored drivetrain torque as a means for controlling the hydraulic pressure within the forward directional clutch 52. It should also be appreciated that similar methodologies may also be used to transition the operation of the transmission between the hydrostatic and hydro-mechanical modes when the vehicle 10 is traveling in reverse.

Referring now to FIG. 9, one embodiment of a method 200 for controlling the operation of a transmission when transitioning from the hydrostatic mode to the hydro-mechanical mode at ground speeds lower than the maximum ground speed for the low speed range of the transmission 24 (e.g., similar to the examples shown in FIGS. 6-8) is illustrated in accordance with aspects of the present subject matter. In general, the method 200 will be described with reference to both the work vehicle 10 shown in FIG. 1 and the transmission configuration shown in FIG. 2. However, it should be appreciated by those of ordinary skill in the art that the disclosed method 200 may generally be utilized to control the operation of any suitable work vehicle have any suitable transmission configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (202), the method 200 includes operating the transmission initially in the hydrostatic mode such that a first range clutch and a secondary range clutch of the transmission are engaged while a directional clutch of the transmission is disengaged. For instance, as indicated above, the transmission 24 may be operated within the hydrostatic mode by engaging a combination of the first and second range clutches R1, R2 or a combination of the first and fourth range clutches R1, R4. Thus, given the configuration of the transmission 24 described above, the "secondary clutch" may correspond to the second range clutch R1 or the fourth range clutch R4. However, using any other CVT configuration, the "secondary clutch" may generally correspond to any range clutch of the CVT that provides for operation with a speed range above the low speed range for the transmission.

Additionally, at (204), the method 200 includes receiving a mode switch signal associated with transitioning the operation of the transmission from the hydrostatic mode to the hydro-mechanical mode while a ground speed of the work vehicle is below a maximum ground speed associated with the transmission's low speed range. As indicated above, in several embodiments, the mode switch signal may correspond to an input signal associated with an operator input received via one or more input devices of the work vehicle 10 (e.g., one or more suitable input buttons). Thus, when the operator uses such input device(s) to select one of the operating modes, a suitable mode switch signal may be generated and transmitted to controller 44 that instructs the controller 44 to initiate the mode switch.

Alternatively, the mode switch signal may be automatically generated by the controller 44. Specifically, in several embodiments, the controller 44 may be configured to continuously monitor the drivetrain torque(s) of the work vehicle 10 (e.g., using the sensors 66, 90, 92, 94 described above with reference to FIG. 2) and compare such torque(s) to a predetermined torque threshold. In such embodiments, if the monitored drivetrain torque(s) exceeds the predetermined torque threshold, the controller 44 may be configured to automatically generate a mode switch signal in order to switch operation of the transmission 24 to the hydro-mechanical mode to allow additional output torque to be transferred through the transmission 24. It should be appreciated that, in embodiments in which the controller 44 generates the mode switch signal, the controller 44 may also be considered to have "received" the mode switch signal since the signal is transmitted from one component of the controller 44 to another while being processed and/or stored within the controller's memory 47.

Referring still to FIG. 9, at (206), the method 200 includes initiating a clutch swap between the secondary range clutch and the directional clutch such that the secondary range clutch is disengaged as the directional clutch is being slipped. For example, as described above with reference to FIGS. 6-8, upon receipt of the mode switch signal (e.g., at points 132 and 140), the second range clutch R2 (or, in other embodiments, the fourth range clutch R4) may be disengaged and the forward directional clutch 52 (or the reverse directional clutch 54 when traveling in reverse) may begin to be engaged.

Additionally, at (208), the method 200 includes adjusting a swash plate angle of the hydrostatic drive unit as the directional clutch is slipped in order to transition the operation of the transmission to the hydro-mechanical mode. For example, as described above with reference to FIGS. 6-8, the swash plate angle may be adjusted while the forward directional clutch 52 (or the reverse directional clutch 54) is slipped to adjust operation of the transmission 24 to a suitable operating point defined along the relevant hydro-mechanical operating curve (e.g., curve 100 or 102). In doing so, the hydraulic pressure within the directional clutch 52, 54 may be carefully regulated using any suitable control strategy that allows for a smooth transition to the hydro-mechanical mode.

Moreover, at (210), the method 200 includes fully engaging the directional clutch to allow for operation of the transmission along the hydro-mechanical operating curve. Specifically, as indicated above, the hydraulic pressure within the directional clutch 52, 54 may be increased while the swash plate angle is being adjusted until the directional clutch 52, 54 is fully engaged (e.g., at points 134 and 142 FIGS. 6-8). Thereafter, the swash plate angle may be further adjusted to allow operation of the transmission 24 within the hydro-mechanical mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a continuously variable transmission of a work vehicle when transitioning operation from a hydrostatic mode to hydro-mechanical mode, the continuously variable transmission configured to provide a hydrostatic drive, the method comprising:
   operating the continuously variable transmission in the hydrostatic mode such that a first range clutch and a secondary range clutch of the continuously variable transmission are engaged and a directional clutch of the continuously variable transmission is disengaged, the first range clutch being associated with operating the continuously variable transmission within a first speed range;
   monitoring a drivetrain torque of the work vehicle;
   receiving, with a computing device, a mode switch signal associated with transitioning the operation of the continuously variable transmission from the hydrostatic mode to the hydro-mechanical mode while a ground speed of the work vehicle is below a maximum ground speed associated with the first speed range, wherein the mode switch signal corresponds to a signal that is generated when the drivetrain torque exceeds a predetermined torque threshold;
   initiating a clutch swap between the secondary range clutch and the directional clutch such that the secondary range clutch is disengaged and the directional clutch begins to slip;
   adjusting a swash plate angle of the hydrostatic drive as the directional clutch is slipped in order to transition the operation of the continuously variable transmission to an operating point defined along a hydro-mechanical operating curve associated with the first speed range for the hydro-mechanical mode; and
   fully engaging the directional clutch to allow operation of the continuously variable transmission along the hydro-mechanical operating curve.

2. The method of claim 1, wherein the mode switch signal is received in response to an operator initiated request for transitioning the operation of the continuously variable transmission from the hydrostatic mode to the hydro-mechanical mode.

3. The method of claim 1, wherein adjusting a swash plate angle of the hydrostatic drive as the directional clutch is slipped comprises adjusting the swash plate angle towards a zero angle position as the directional clutch is slipped in order to transition the operation of the continuously variable transmission to the operating point defined along the hydro-mechanical operating curve.

4. The method of claim 1, further comprising pre-filling the directional clutch while the continuously variable transmission is being operated in the hydrostatic mode.

5. The method of claim 1, wherein the secondary clutch comprises a second range clutch of the continuously variable transmission or a fourth range clutch of the continuously variable transmission.

6. The method of claim 1, wherein the directional clutch comprises a forward directional clutch of the continuously variable transmission when the work vehicle is traveling in a forward direction and a reverse directional clutch of the continuously variable transmission when the work vehicle is traveling in a reverse direction.

7. The method of claim 1, further comprising adjusting the swash plate angle after the directional clutch is fully engaged to adjust the ground speed of the work vehicle along the hydro-mechanical operating curve towards the maximum ground speed associated with the first speed range.

8. A work vehicle, comprising:
   a continuously variable transmission configured to provide a hydrostatic drive, the continuously variable transmission further including a first range clutch, a secondary range clutch and a directional clutch, the continuously variable transmission being configured to operate in a hydrostatic mode and a hydro-mechanical mode; and
   a controller configured to control the operation of the continuously variable transmission, the controller including a processor and associated memory, the memory storing computer-readable instructions that, when executed by the processor, configure the controller to:
   operate the continuously variable transmission in the hydrostatic mode such that the first range clutch and the secondary range clutch are engaged and the directional clutch is disengaged, the first range clutch being associated with operating the continuously variable transmission within a first speed range;
   receive a mode switch signal associated with transitioning the operation of the continuously variable transmission from the hydrostatic mode to the hydro-mechanical mode while a ground speed of the work vehicle is below a maximum ground speed associated with the first speed range;
   initiate a clutch swap between the secondary range clutch and the directional clutch such that the secondary range clutch is disengaged and the directional clutch begins to slip;
   adjust a swash plate angle of the hydrostatic drive towards a zero angle position as the directional clutch is slipped in order to transition the operation of the continuously variable transmission to an operating point defined along a hydro-mechanical operating curve associated with the first speed range for the hydro-mechanical mode; and
   fully engage the directional clutch to allow for operation of the continuously variable transmission along the hydro-mechanical operating curve.

9. The work vehicle claim 8, wherein the mode switch signal is received in response to an operator initiated request for transitioning the operation of the continuously variable transmission from the hydrostatic mode to the hydro-mechanical mode.

10. The work vehicle claim 8, further at least one sensor coupled to the controller for monitoring a drivetrain torque of the work vehicle.

11. The work vehicle claim 10, wherein the controller is configured to generate the mode switch signal when the drivetrain torque exceeds a predetermined torque threshold.

12. The work vehicle claim 8, wherein the controller is further configured to pre-fill the directional clutch while the continuously variable transmission is being operated in the hydrostatic mode.

13. The work vehicle claim 8, wherein the secondary clutch comprises a second range clutch of the continuously variable transmission or a fourth range clutch of the continuously variable transmission.

14. The work vehicle claim 8, wherein the directional clutch comprises a forward directional clutch of the continuously variable transmission when the work vehicle is traveling in a forward direction and a reverse directional clutch of the continuously variable transmission when the work vehicle is traveling in a reverse direction.

15. A work vehicle, comprising:
a continuously variable transmission configured to provide a hydrostatic drive, the continuously variable transmission further including a first range clutch, a secondary range clutch and a directional clutch, the continuously variable transmission being configured to operate in a hydrostatic mode and a hydro-mechanical mode; and
a controller configured to control the operation of the continuously variable transmission, the controller including a processor and associated memory, the memory storing computer-readable instructions that, when executed by the processor, configure the controller to:
operate the continuously variable transmission in the hydrostatic mode such that the first range clutch and the secondary range clutch are engaged and the directional clutch is disengaged, the first range clutch being associated with operating the continuously variable transmission within a first speed range;
receive a mode switch signal associated with transitioning the operation of the continuously variable transmission from the hydrostatic mode to the hydro-mechanical mode while a ground speed of the work vehicle is below a maximum ground speed associated with the first speed range;
initiate a clutch swap between the secondary range clutch and the directional clutch such that the secondary range clutch is disengaged and the directional clutch begins to slip;
adjust a swash plate angle of the hydrostatic drive as the directional clutch is slipped in order to transition the operation of the continuously variable transmission to an operating point defined along a hydro-mechanical operating curve associated with the first speed range for the hydro-mechanical mode; and
fully engage the directional clutch to allow for operation of the continuously variable transmission along the hydro-mechanical operating curve,
wherein the controller is further configured to further adjust the swash plate angle after the directional clutch is fully engaged to adjust the ground speed of the work vehicle along the hydro-mechanical operating curve towards the maximum ground speed associated with the first speed range.

* * * * *